PETER W. WEIDA, OF PHILADELPHIA, PENNSYLVANIA.

Letters Patent No. 87,607, dated March 9, 1869.

IMPROVED STARCH OR GLOSS FOR USE IN LAUNDRIES.

The Schedule referred to in these Letters Patent and making part of the same.

*To all whom it may concern:*

Be it known that I, PETER W. WEIDA, of the city and county of Philadelphia, in the State of Pennsylvania, have invented a new and useful Recipe for the Manufacture of "Starch;" and I do hereby declare that the following is a full and exact description of my recipe.

The object of my invention is to produce a starch so composed, that when applied to washed linen and clothes, it will allow an easy ironing, and produce a fine, glossy appearance.

To enable others skilled in the art to make and use my invention, I will now proceed to describe my composition.

I take, of spermaceti, eight pounds; gum-arabic, three pounds; white wax, five pounds; ordinary wheat-starch, two pounds; tallow, treated with alum, and pulverized, two pounds; equal to twenty pounds.

The above ingredients are to be used in their dry, pulverized state, and thoroughly mixed up together.

To use my preparation, take, of it, one table-spoonful to one pint of ordinary starch, viz, the ordinary starch-preparation of two ounces of starch to one pint of water.

I do not limit myself to the above figures, but reserve the right to mix up the same ingredients in larger or smaller proportions, as I may hereafter see fit; but What I do claim as my invention, and desire to secure by Letters Patent of the United States, is—

A composition composed of the above-named ingredients, for the purpose of giving gloss and smoothness to ordinary starch, as aforesaid and described.

PETER W. WEIDA. [L. S.]

Witnesses:
SAMUEL L. TAYLOR,
WILLIAM W. ROBERTS.